(12) United States Patent
Zhang et al.

(10) Patent No.: US 12,422,406 B2
(45) Date of Patent: Sep. 23, 2025

(54) METHOD AND SYSTEM FOR DETECTING STRUCTURAL DEFECT IN ADDITIVE MANUFACTURING

(71) Applicant: NANJING UNIVERSITY OF AERONAUTICS AND ASTRONAUTICS, Nanjing (CN)

(72) Inventors: Chao Zhang, Nanjing (CN); Zhaomin Wang, Nanjing (CN); Hongli Ji, Nanjing (CN); Jinhao Qiu, Nanjing (CN); Chongcong Tao, Nanjing (CN); Jun Wang, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 481 days.

(21) Appl. No.: 18/050,656

(22) Filed: Oct. 28, 2022

(65) Prior Publication Data

US 2023/0417707 A1  Dec. 28, 2023

(30) Foreign Application Priority Data

Jun. 24, 2022 (CN) .......................... 202210727484.4

(51) Int. Cl.
*G01N 29/06* (2006.01)
*B33Y 40/00* (2020.01)
(Continued)

(52) U.S. Cl.
CPC .............. *G01N 29/06* (2013.01); *B33Y 40/00* (2014.12); *B33Y 50/00* (2014.12); *G01N 29/225* (2013.01);
(Continued)

(58) Field of Classification Search
CPC ........ G01N 29/06; G01N 29/14; G01N 29/44; G01N 29/48; B33Y 50/00; B33Y 10/00;
(Continued)

(56) References Cited

U.S. PATENT DOCUMENTS

2018/0071986 A1* 3/2018 Buller .................... B29C 64/20
2018/0126650 A1* 5/2018 Murphree ................ B08B 5/04
2018/0281284 A1* 10/2018 Elgar ................... B29C 64/371

FOREIGN PATENT DOCUMENTS

WO    WO-2015109096 A1 * 7/2015 ........... G01N 29/262

\* cited by examiner

*Primary Examiner* — Francis C Gray
(74) *Attorney, Agent, or Firm* — Dinsmore & Shohl LLP

(57) ABSTRACT

The present disclosure relates to a method and system for detecting a structural defect in additive manufacturing. The method includes: layering a three-dimensional model of an additive manufacturing test piece to obtain a two-dimensional contour of an interface of each layer, and generating a machining path; arranging a non-contact sensor at a fixed measuring point of the additive manufacturing test piece, and acquiring an ultrasonic signal at each machining point when a pulse laser conducts machining point by point along the machining path; forming a visual ultrasonic field based on all the ultrasonic signals, and determining ultrasonic field data; determining, based on the ultrasonic field data, a curve of a peak of an incident wave changing with the machining path; and determining whether a machining defect exists at the machining points based on the curve of the peak of the incident wave changing with the machining path.

6 Claims, 7 Drawing Sheets

(51) Int. Cl.
*B33Y 50/00* (2015.01)
*G01N 29/22* (2006.01)
*G01N 29/46* (2006.01)

(52) U.S. Cl.
CPC ..... *G01N 29/46* (2013.01); *G01N 2291/0289* (2013.01)

(58) Field of Classification Search
CPC ......... B33Y 30/00; B33Y 50/02; Y02P 10/25; B22F 10/30; B22F 10/80; B22F 10/85; B22F 12/82; B22F 12/90
See application file for complete search history.

METHOD AND SYSTEM FOR DETECTING STRUCTURAL DEFECT IN ADDITIVE MANUFACTURING

CROSS REFERENCE TO RELATED APPLICATION

This patent application claims the benefit and priority of Chinese Patent Application No. 202210727484.4, filed with the China National Intellectual Property Administration on Jun. 24, 2022, the disclosure of which is incorporated by reference herein in its entirety as part of the present application.

TECHNICAL FIELD

The present disclosure relates to the technical field of nondestructive testing of additive manufacturing structures, and in particular, to a method and system for detecting a structural defect in additive manufacturing.

BACKGROUND

The additive manufacturing technology is applied to melt and stack, based on three-dimensional model data, metal powder or wires layer by layer to manufacture parts. This technology integrates materials, optics, machinery and other technologies, and has the advantages of automation, flexibility, high material utilization, etc. Currently, testing of additive manufacturing is mostly performed after machining is completed. If structural testing during additive manufacturing can be implemented, a waste can be effectively reduced and product quality can be improved. Among many nondestructive testing means, laser ultrasonic technology, as a kind of non-contact ultrasonic testing technology, has application potential in identifying a structural defect in additive manufacturing, and how to implement real-time online testing has become a research hotspot of this technology.

SUMMARY

An objective of the present disclosure is to provide a method and system for detecting a structural defect in additive manufacturing, to resolve the problem that current nondestructive testing means cannot implement real-time online testing.

To achieve the foregoing objective, the present disclosure provides the following technical solutions.

Step 1: layering a three-dimensional model of an additive manufacturing test piece to obtain a two-dimensional contour of a cross section of each layer, thereby generating a machining path. In a manufacturing chamber, a pulse laser with a high energy density is used for machining and molding, and an ultrasonic wave generated during additive manufacturing is measured in real time by using a non-contact sensor at a fixed point. When the pulse laser conducts machining point by point along a preset path, an ultrasonic signal corresponding to an $i^{th}$ machining point and obtained through non-contact measurement is $s_i(t)$.

Step 2: forming an ultrasonic field by a series of ultrasonic signals obtained at the fixed point during additive manufacturing; allowing the ultrasonic field to be equivalent to exciting an ultrasonic wave at the fixed measuring point, and sensing an ultrasonic signal at each point in the machining path; and sequentially putting the ultrasonic signals into a two-dimensional array to obtain ultrasonic field data $w(x,t)$. For example, a spatial position corresponding to the $i^{th}$ machining point is x, that is, $w(x,t)=s_i(t)$ and t is a time, thereby implementing visualization of the additive manufacturing ultrasonic field.

Step 3: separating an incident/reflected wave from the additive manufacturing ultrasonic field data by using a windowed filtering method, removing a reflected wave field generated by a structural boundary, and obtaining a curve $A(x)$ of a peak of the incident wave changing with the machining path.

Step 4: setting a damage threshold thres, extracting a slope change of $A(x)$ along a space as a damage factor, and if the change is greater than a threshold, determining that a machining defect exists at the position.

According to the specific embodiments provided in the present disclosure, the present disclosure discloses the following technical effects: The present disclosure provides the method and system for detecting a structural defect in additive manufacturing, which reconstruct ultrasonic signals during additive manufacturing to form a visual ultrasonic field, implement visualization of the ultrasonic field during additive manufacturing, and test machining points in the machining path online in real time, thereby reducing a waste, improving product quality, detecting a structural defect online in real time, and removing a defective product.

BRIEF DESCRIPTION OF THE DRAWINGS

To describe the technical solutions in the embodiments of the present disclosure or in the prior art more clearly, the accompanying drawings required for the embodiments are briefly described below. Apparently, the accompanying drawings in the following description show merely some embodiments of the present disclosure, and a person of ordinary skill in the art may still derive other accompanying drawings from these accompanying drawings without creative efforts.

DETAILED DESCRIPTION OF THE EMBODIMENTS

The technical solutions of the embodiments of the present disclosure are clearly and completely described below with reference to the accompanying drawings. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a method and system for detecting a structural defect in additive manufacturing, which can detect a structural defect online in real time, and remove a defective product.

To make the foregoing objective, features, and advantages of the present disclosure clearer and more comprehensible, the present disclosure will be further described in detail below with reference to the accompanying drawings and specific implementations.

Figure 1:
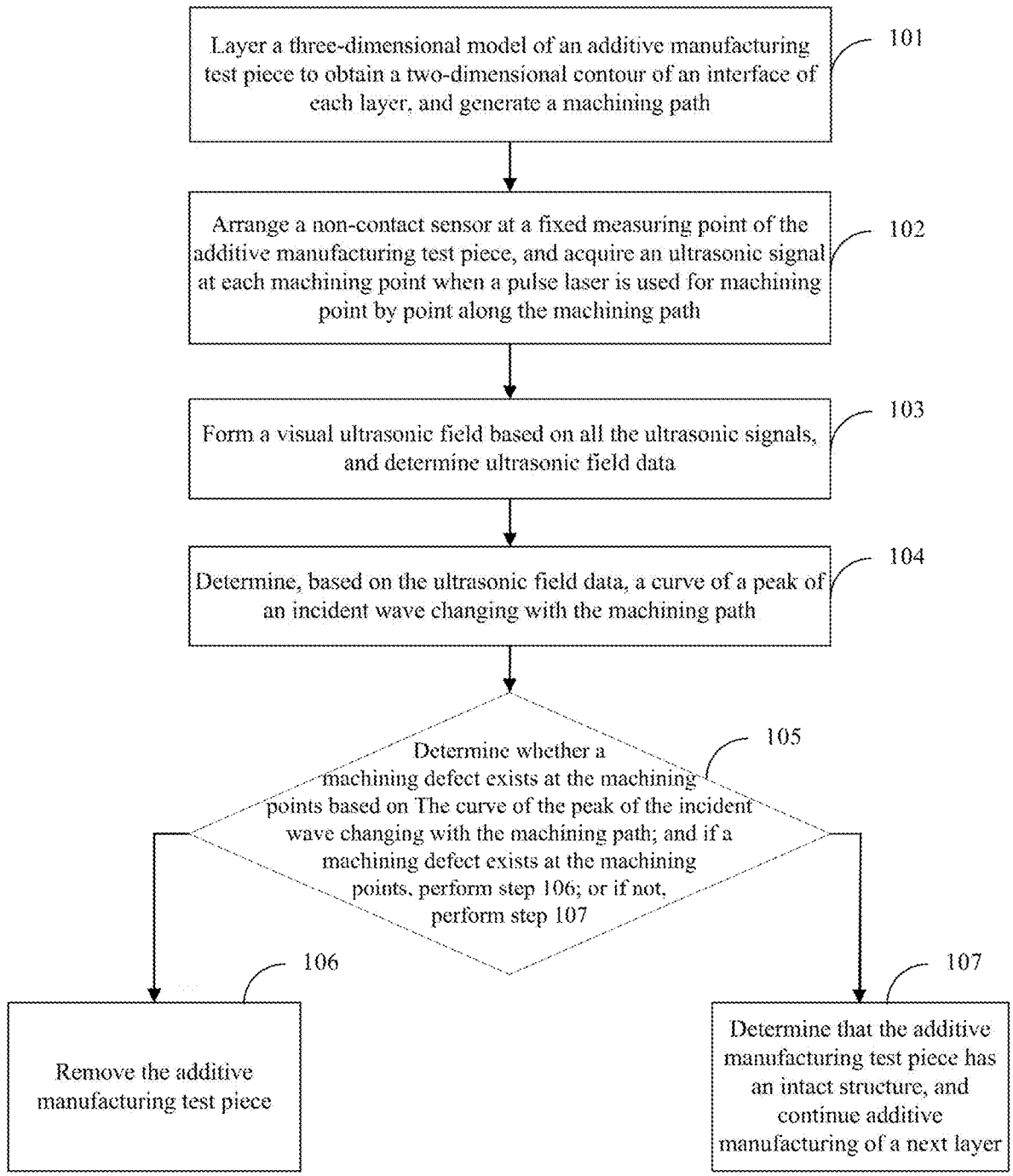
FIG. 1 is a flowchart of a method for detecting a structural defect in additive manufacturing according to the present disclosure.

FIG. 1 is a flowchart of a method for detecting a structural defect in additive manufacturing according to the present disclosure. As shown in FIG. 1, the method for detecting a structural defect in additive manufacturing includes the following steps.

Step 101: Layer a three-dimensional model of an additive manufacturing test piece to obtain a two-dimensional contour of an interface of each layer, and generate a machining path.

Step 102: Arrange a non-contact sensor at a fixed measuring point of the additive manufacturing test piece, and acquire an ultrasonic signal at each machining point when a pulse laser conducts machining point by point along the machining path.

Step 103: Form a visual ultrasonic field based on all the ultrasonic signals, and determine ultrasonic field data.

Step 103 specifically includes: allowing the visual ultrasonic field to be equivalent to exciting an ultrasonic wave at the fixed measuring point, and sensing an ultrasonic signal at each machining point of the machining path; and putting the ultrasonic signals measured along the machining path into a two-dimensional array in chronological order to determine the ultrasonic field data.

Step 104: Determine, based on the ultrasonic field data, a curve of a peak of an incident wave changing with the machining path.

Step 104 specifically includes: separating the incident wave and a reflected wave from the ultrasonic field data by using a windowed filtering method, then obtaining the incident wave through two-dimensional inverse Fourier transform, and removing a reflected wave field generated by a structural boundary of the additive manufacturing test piece; performing continuous wavelet transform on the incident wave to determine a signal amplitude of the incident wave; and extracting a signal peak of the incident wave based on the signal amplitude of the incident wave, and determining the curve of the peak of the incident wave changing with the machining path.

Step 105: Determine whether a machining defect exists at the machining points based on the curve of the peak of the incident wave changing with the machining path; and if a machining defect exists at the machining points, perform step 106; or if not, perform step 107.

Step 106: Remove the additive manufacturing test piece.

Step 107: Determine that the additive manufacturing test piece has an intact structure, and continue additive manufacturing of a next layer.

Steps 105 to 107 specifically include: setting a damage threshold; extracting a slope change that is along a space and that is of the curve of the peak of the incident wave changing along the machining path, and taking the slope change as a damage factor; and determining, if the damage factor is greater than the damage threshold, that a machining defect exists at the machining points, and removing the additive manufacturing test piece; or determining, if the damage factor is less than the damage threshold, that no machining defect exists at the machining points, determining that the additive manufacturing test piece has an intact structure, and continuing additive manufacturing of the next layer.

Figure 2:
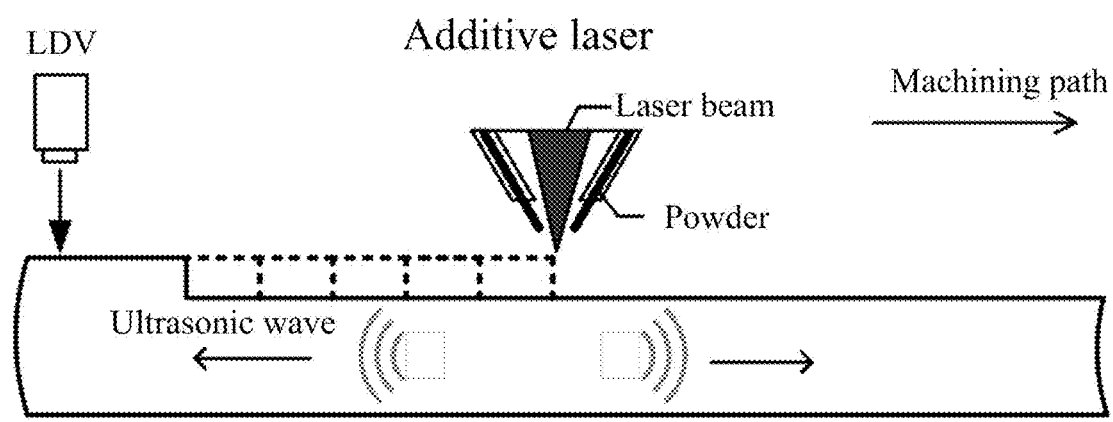
FIG. 2 is a diagram of a principle of ultrasonic excitation and measurement in an additive manufacturing process according to the present disclosure.

In practical application, a laser Doppler vibrometer (LDV) is arranged on a left side of the additive manufacturing test piece, so that a vibration measuring laser beam is perpendicular to a test piece surface. An additive laser begins manufacturing toward the right side along the machining path, as shown in FIG. 2.

A detection operation process mainly includes the following steps.

Figure 3:
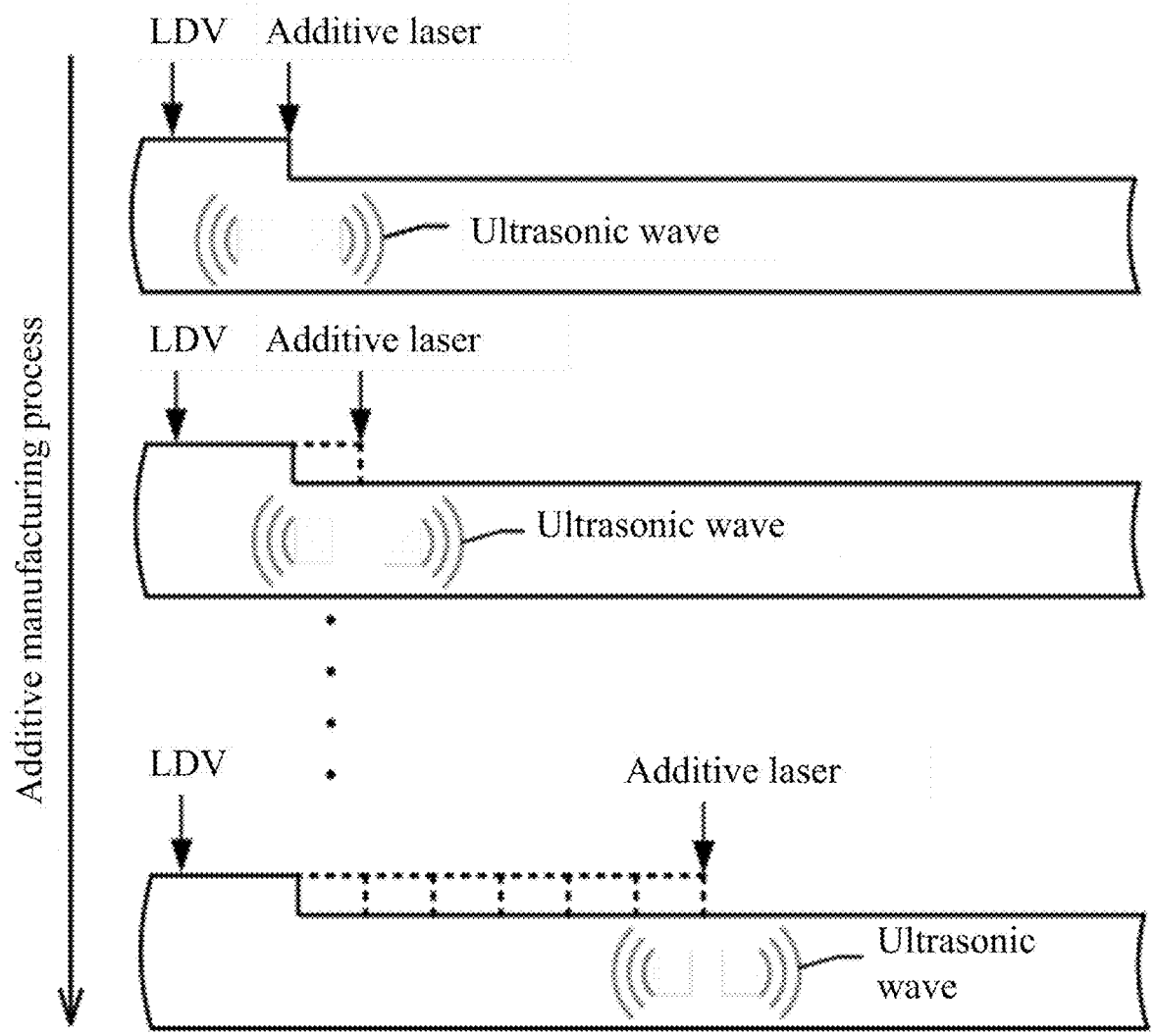
FIG. 3 is a diagram of a corresponding relationship between ultrasonic signals and a machining path in an additive manufacturing process according to the present disclosure.

Step 1: Layer a three-dimensional model of an additive manufacturing test piece to obtain two-dimensional contour information of a cross section of each layer, and generate a machining path on this basis. In a manufacturing chamber, a pulse laser with a high energy density is used for machining and molding, and an ultrasonic wave generated during additive manufacturing is measured in real time by using a non-contact sensor at a fixed point, as shown in FIG. 3. When the pulse laser conducts machining point by point along a preset path, an ultrasonic signal corresponding to an $i^{th}$ machining point and obtained through non-contact measurement is $s_i(t)$.

Figure 4:
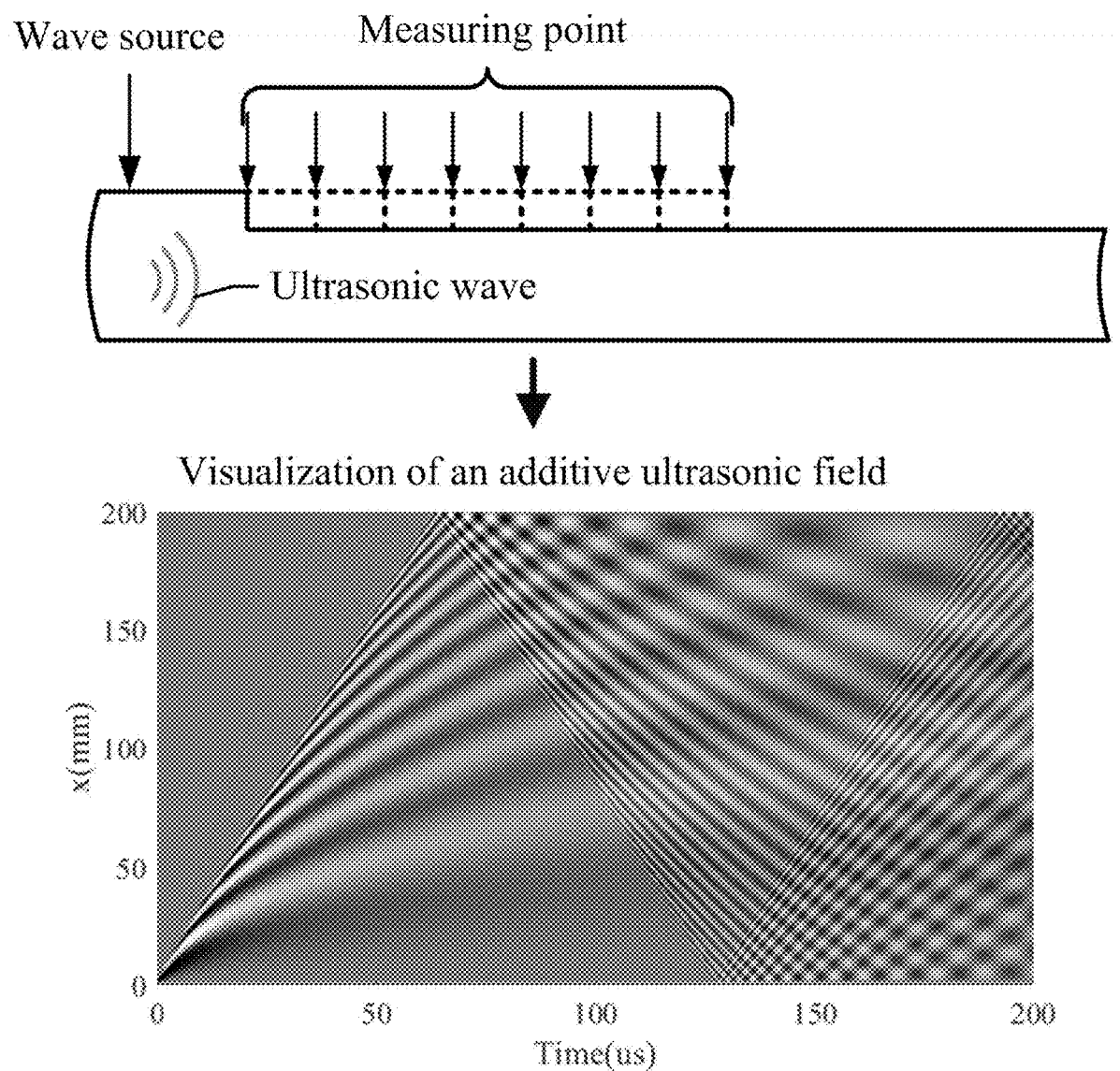
FIG. 4 is a schematic diagram of visualization of an ultrasonic field in an additive manufacturing process according to the present disclosure.

Step 2: Form an ultrasonic field by a series of ultrasonic signals obtained at the fixed point during additive manufacturing; allow the ultrasonic field to be equivalent to exciting an ultrasonic wave at the fixed measuring point, and sense an ultrasonic signal at each point in the machining path; and sequentially put the ultrasonic signals measured along the additive manufacturing path into a two-dimensional array to obtain ultrasonic field data w(x,t). For example, a spatial position corresponding to the $i^{th}$ machining point is x, that is, $w(x,t)=s_i(t)$, as shown in FIG. 4. A propagation state of the ultrasonic field in an additive manufacturing region at any moment t can be obtained by extracting data at this moment in ultrasonic field signals.

Figure 5:
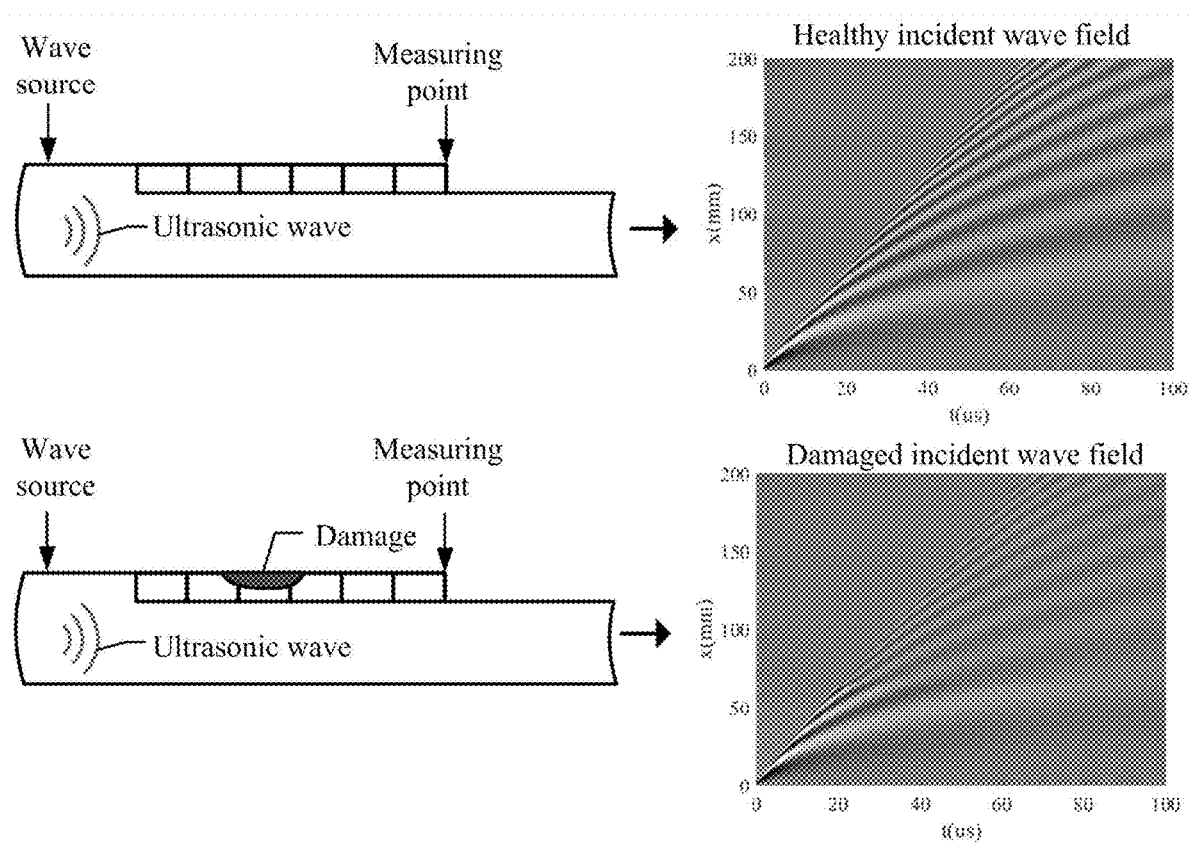
FIG. 5 is a schematic diagram of an ultrasonic field in an additive manufacturing process with a defect according to the present disclosure.

Step 3: When damage is caused in additive manufacturing along the machining path, as shown in FIG. 5, and complex reflection occurs to the damage and a structural boundary, separate an incident/reflected wave from the additive manufacturing ultrasonic field, and convert w(x,t) to $W(k_x, \omega)$ through two-dimensional Fourier transform, specifically as follows:

$$W(k_x, \omega) = \int_{-\infty}^{+\infty} \int_{-\infty}^{+\infty} w(x, t)e^{-j(\omega t + k_x x)} dx dt$$

where j represents an imaginary unit. To extract an incident wave signal from the ultrasonic field, windowed filtering is performed on obtained $W(k_x, \omega)$. $W(k_x, \omega)$ is a signal expression in a wave number-frequency domain, $k_x$ is a number of ultrasonic waves, and $\omega$ is a frequency of the ultrasonic waves. A selected window function type is a rectangular window function $\Phi(k_x, \omega)$:

$$\Phi(k_x, \omega) = \begin{cases} 0 & k_x \omega \geq 0 \\ 1 & k_x \omega < 0 \end{cases}$$

An incident wave $w_i(x,t)$ is obtained through two-dimensional inverse Fourier transform:

$$w_i(x, t) = \frac{1}{2\pi} \int_{-\infty}^{+\infty} \int_{-\infty}^{+\infty} W(k_x, \omega)\Phi(k_x, \omega)e^{j(\omega t + k_x x)} dk_x d\omega$$

Step 4: Perform continuous wavelet transform on $w_i(x,t)$ to obtain a signal amplitude of the incident wave specifically as follows:

$$CWT(x, b) = \frac{1}{\sqrt{a}} \int_{-\infty}^{\infty} w_i(x, t)\psi^*\left(\frac{t-b}{a}\right) dt$$

where a and b are a scale factor and a shift factor in wavelet transform, respectively, and $\psi^*$ is a mother wavelet function and is a complex conjugate function of $\psi$. The selected wavelet function is shown as follows:

$$\psi(t) = e^{-t^2/2}\cos(5t)$$

A signal peak of the incident wave after wavelet transform is extracted, to obtain a relationship curve $A(x)$ of the peak of the incident wave changing along the machining path, specifically as follows:

$$A(x) = \max[CWT(x,:)]$$

Figure 6:
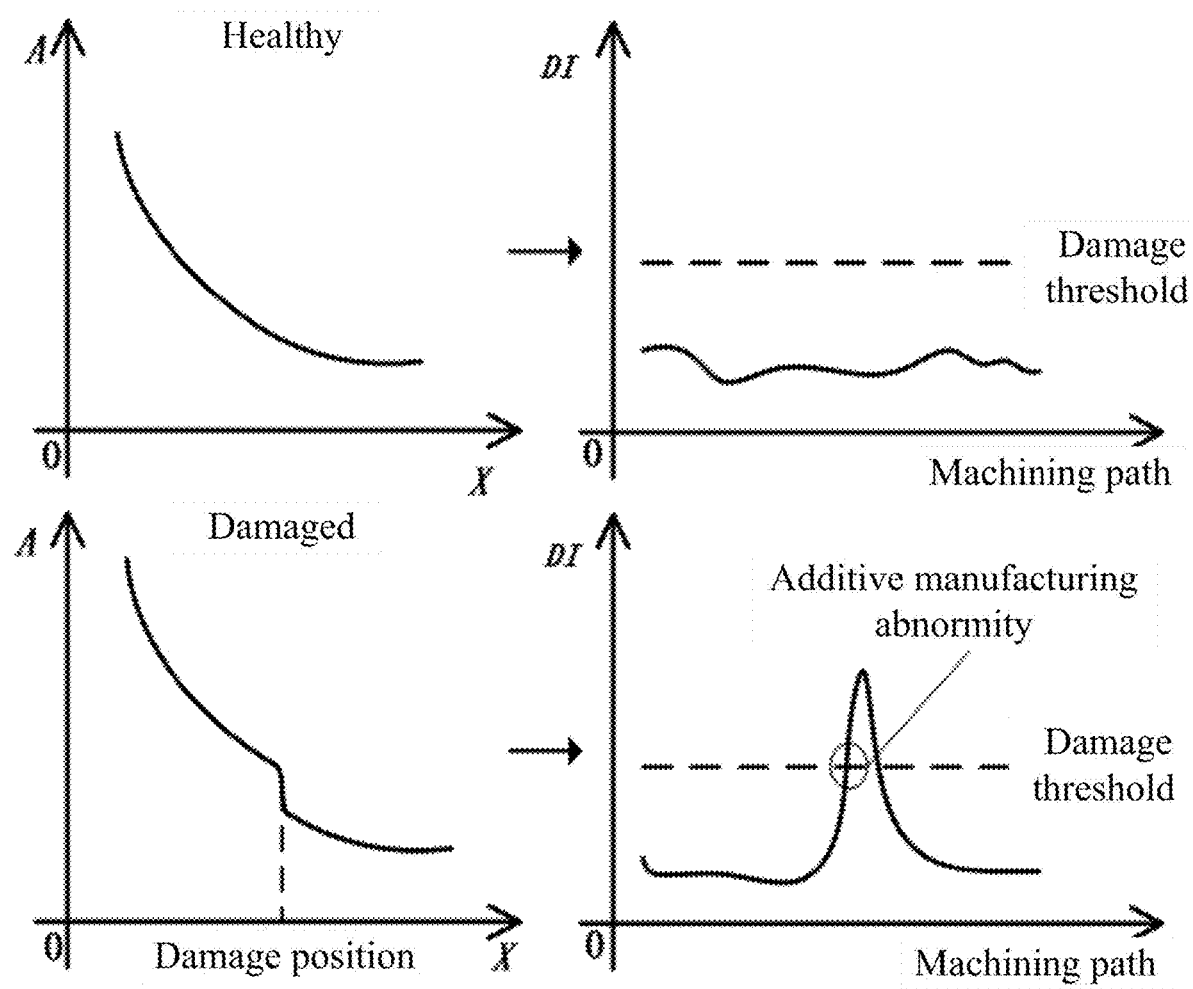
FIG. 6 is a schematic diagram of an additive manufacturing defect detection result according to the present disclosure.

As shown in FIG. 6, a damage threshold thres is set, and a slope change of $A(x)$ along a space is extracted as a damage factor, that is: $DI(x) = |dA(x)/dx|$; and if the slope change is greater than a threshold, that is, $DI(x) \geq$ thres, it is determined that a machining defect exists in the additive manufacturing structure at the point; or if the slope change is less than the threshold, that is, $DI(x) <$ thres, is determined that the additive manufacturing structure is intact, and additive manufacturing of the next layer is continued.

Figure 7:
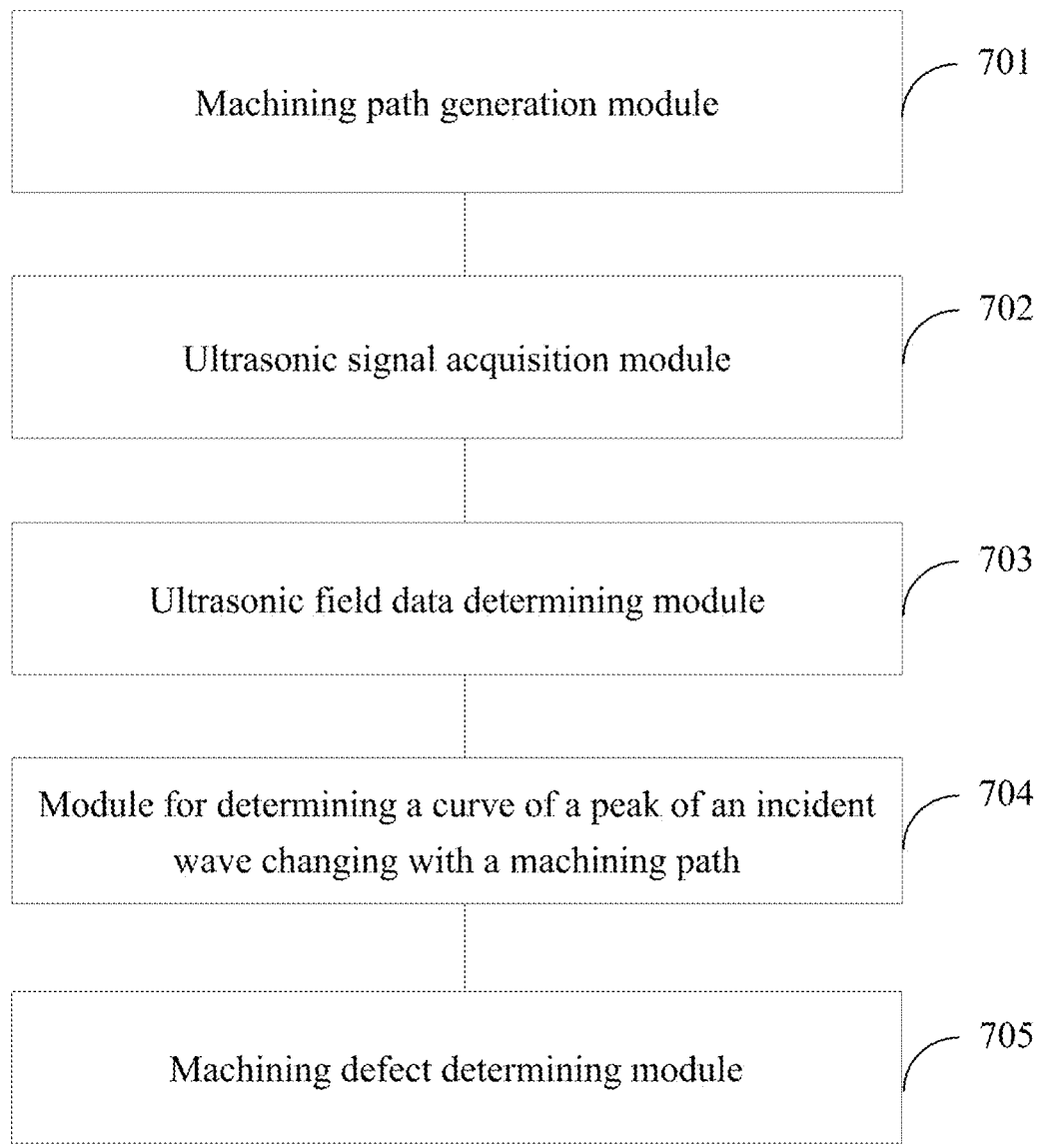
FIG. 7 is a structural diagram of a system for detecting a structural defect in additive manufacturing according to the present disclosure.

FIG. 7 is a structural diagram of a system for detecting a structural defect in additive manufacturing according to the present disclosure. As shown in FIG. 7, the system for detecting a structural defect in additive manufacturing includes:

a machining path generation module 701, configured to layer a three-dimensional model of an additive manufacturing test piece to obtain a two-dimensional contour of an interface of each layer, and generate a machining path;

an ultrasonic signal acquisition module 702, configured to arrange a non-contact sensor at a fixed measuring point of the additive manufacturing test piece, and acquire an ultrasonic signal at each machining point when a pulse laser conducts machining point by point along the machining path;

an ultrasonic field data determining module 703, configured to form a visual ultrasonic field based on all the ultrasonic signals, and determine ultrasonic field data, the ultrasonic field data determining module 703 specifically including: an ultrasonic signal sensing unit, configured to allow the visual ultrasonic field to be equivalent to exciting an ultrasonic wave at the fixed measuring point, and sense an ultrasonic signal at each machining point of the machining path; and an ultrasonic field data determining unit, configured to put the ultrasonic signals measured along the machining path into a two-dimensional array in chronological order to determine the ultrasonic field data;

a module 704 for determining a curve of a peak of an incident wave changing with a machining path, configured to determine, based on the ultrasonic field data, a curve of a peak of an incident wave changing with the machining path, the module 704 for determining a curve of a peak of an incident wave changing with a machining path specifically including: a reflected wave field removal unit, configured to separate the incident wave and a reflected wave from the ultrasonic field data by using a windowed filtering method, then obtain the incident wave through two-dimensional inverse Fourier transform, and remove a reflected wave field generated by a structural boundary of the additive manufacturing test piece; an incident wave signal peak determining unit, configured to perform continuous wavelet transform on the incident wave to determine a signal amplitude of the incident wave; and a unit for determining a curve of a peak of an incident wave changing with a machining path, configured to extract a signal peak of the incident wave based on the signal amplitude of the incident wave, and determine the curve of the peak of the incident wave changing with the machining path; and a machining defect determining module 705, configured to determine whether a machining defect exists at the machining points based on the curve of the peak of the incident wave changing with the machining path; and if a machining defect exists at the machining points, remove the additive manufacturing test piece; or if no machining defect exists at the machining points, determine that the additive manufacturing test piece has an intact structure, and continue additive manufacturing of a next layer;

the machining defect determining module 705 specifically including: a damage threshold setting unit, configured to set a damage threshold; a damage factor determining unit, configured to extract a slope change that is along a space and that is of the curve of the peak of the incident wave changing along the machining path, and take the slope change as a damage factor; a machining defect determining unit, configured to determine, if the damage factor is greater than the damage threshold, that a machining defect exists at the machining points, and remove the additive manufacturing test piece; and an additive manufacturing unit, configured to determine, if the damage factor is less than the damage threshold, that no machining defect exists at the machining points, determine that the additive manufacturing test piece has an intact structure, and continue additive manufacturing of the next layer.

The method and system for detecting a structural defect in additive manufacturing according to the present disclosure can overcome the shortcoming that conventional ultrasonic testing cannot be used for testing during manufacturing, determine ultrasonic field data by forming the visual ultrasonic field during additive manufacturing, and implement online real-time defect identification during additive manufacturing.

The embodiments of this specification are described in a progressive manner, each embodiment focuses on the difference from other embodiments, and the same and similar parts between the embodiments may refer to each other. Since the system disclosed in an embodiment corresponds to the method disclosed in another embodiment, the description is relatively simple, and reference may be made to the method description.

Specific examples are used herein to explain the principles and implementations of the present disclosure. The foregoing description of the embodiments is merely intended to help understand the method of the present disclosure and its core ideas. Besides, modifications may be made by a person of ordinary skill in the art to specific implementations and the scope of application in accordance with the ideas of the present disclosure. In conclusion, the content of this specification shall not be construed as limitations to the present disclosure.

What is claimed is:

1. A method for detecting a structural defect in additive manufacturing, comprising:

layering a three-dimensional model of an additive manufacturing test piece to obtain a two-dimensional contour of an interface of each layer, and generating a machining path;

arranging a non-contact sensor at a fixed measuring point of the additive manufacturing test piece, and acquiring an ultrasonic signal at each machining point when a pulse laser conducts machining point by point along the machining path;

forming a visual ultrasonic field based on all the ultrasonic signals and determining ultrasonic field data, wherein the forming the visual ultrasonic field based on all the ultrasonic signals, and determining the ultrasonic field data comprises:

allowing the visual ultrasonic field to be equivalent to exciting an ultrasonic wave at the fixed measuring point, and sensing the ultrasonic signal at each machining point of the machining path; and placing the ultrasonic signals measured along the machining path into a two-dimensional array in chronological order to determine the ultrasonic field data;

determining, based on the ultrasonic field data, a curve of a peak of an incident wave changing with the machining path;

determining whether a machining defect exists at each machining point based on the curve of the peak of the incident wave changing with the machining path; and performing one of the following:

if the machining defect exists at each machining point, removing the additive manufacturing test piece, or if the machining defect does not exist at each machining point, determining that the additive manufacturing test piece has an intact structure, and continuing additive manufacturing of a next layer.

2. The method according to claim 1, wherein the determining, based on the ultrasonic field data, the curve of the peak of the incident wave changing with the machine path further comprises:

separating the incident wave and a reflected wave from the ultrasonic field data by using a windowed filtering method, then obtaining the incident wave through a two-dimensional inverse Fourier transform, and removing a reflected wave field generated by a structural boundary of the additive manufacturing test piece;

performing a continuous wavelet transform on the incident wave to determine a signal amplitude of the incident wave; and extracting a signal peak of the incident wave based on the signal amplitude of the incident wave, and determining the curve of the peak of the incident wave changing with the machining path.

3. The method according to claim 1, wherein the determining whether the machining defect exists at each machining point based on the curve of the peak of the incident wave changing with the machining path further comprises:

setting a damage threshold;

extracting a slope change that is along a space and that is of the curve of the peak of the incident wave changing along the machining path, and taking the slope change as a damage factor; and performing one of the following:

determining, if the damage factor is greater than the damage threshold, that the machining defect exists at each machining point, and removing the additive manufacturing test piece; or determining, if the damage factor is less than the damage threshold, that the machining defect does not exist at each machining point, determining that the additive manufacturing test piece has the intact structure, and continuing additive manufacturing of the next layer.

4. A system for detecting a structural defect in additive manufacturing, comprising:

a machining path generation module, configured to layer a three-dimensional model of an additive manufacturing test piece to obtain a two-dimensional contour of an interface of each layer, and generate a machining path;

an ultrasonic signal acquisition module, configured to arrange a non-contact sensor at a fixed measuring point of the additive manufacturing test piece, and acquire an ultrasonic signal at each machining point when a pulse laser conducts machining point by point along the machining path;

an ultrasonic field data determining module, configured to form a visual ultrasonic field based on all the ultrasonic signals, and determine ultrasonic field data, wherein the ultrasonic field data determining module further comprises:

an ultrasonic signal sensing unit, configured to allow the visual ultrasonic field to be equivalent to exciting an ultrasonic wave at the fixed measuring point. and sense the ultrasonic signal at each machining point of the machining path; and an ultrasonic field data determining unit, configured to place the ultrasonic signals measured along the machining path into a two-dimensional array in chronological order to determine the ultrasonic field data;

a module, configured to determine, based on the ultrasonic field data, a curve of a peak of an incident wave changing with the machining path;

a machining defect determining module, configured to determine whether a machining defect exists at each machining point based on the curve of the peak of the incident wave changing with the machining path; and performing one of the following:

if the machining defect exists at each machining point, removing the additive manufacturing test piece; or if the machining defect does not exist at each machining point, determining that the additive manufacturing test piece has an intact structure, and continuing additive manufacturing of a next layer.

5. The system according to claim 4, wherein the module for determining the curve of the peak of the incident wave changing with the machining path comprises:

a reflect wave field removal unit, configured to separate the incident wave and a reflected wave from the ultrasonic field data by using a windowed filtering method, then obtain the incident wave through a two-dimensional inverse Fourier transform, and remove a reflected wave field generated by a structural boundary of the additive manufacturing test piece;

an incident wave signal peak determining unit, configured to perform a continuous wavelet transform on the incident wave to determine a signal amplitude of the incident wave; and a unit for determining the curve of the peak of the incident wave changing with the machining path, configured to extract a signal peak of the incident wave based on the signal amplitude of the incident wave, and determine the curve of the peak of the incident wave changing with the machining path.

6. The system according to claim 4, wherein the machining defect determining module further comprises:

a damage threshold setting unit, configured to set a damage threshold;

a damage factor determining unit, configured to extract a slope change that is along a space and that is of the curve of the peak of the incident wave changing along the machining path, and take the slope change as a damage factor;

a machining defect determining unit, configured to determine, if the damage factor is greater than the damage threshold, that the machining defect exists at each machining point, and remove the additive manufacturing test piece; and an additive manufacturing unit, configured to determine, if the damage factor is les than the damage threshold, that the machining defect does not exist at each machining point, determine that the additive manufacturing test piece has the intact structure, and continue additive manufacturing of the next layer.

* * * * *